United States Patent Office.

STEPHEN M. ALLEN, OF WOBURN, MASSACHUSETTS.

*Letters Patent No. 69,742, dated October 15, 1867.*

IMPROVED ARTIFICIAL LEATHER FOR FLOOR-COVERINGS.

*The Schedule referred to in these Letters Patent and making part of the same.*

TO ALL WHOM IT MAY CONCERN:

Be it known that I, STEPHEN M. ALLEN, of Woburn, in the county of Middlesex, and State of Massachusetts, have invented a new and improved Article and Mode of Manufacture of Figured or Ornamental Floor-Coverings; and I hereby declare that the following is a full, clear, and exact description of the same.

In the manufacture and use of pulped or mastic-leather floor-cloths, my experience has suggested some important improvements over the process described in Letters Patent heretofore granted me, which additions I desire to secure by Letters Patent.

I have found that strength and toughness in the sheets, evenness and smoothness in laying on the floor, and imperviousness to water or dampness, are important points to be secured, and to accomplish this object fully additional substances may, with great advantage, be mixed with and used in the pulp itself, instead of using, as is ordinarily the case, foreign substances on the outside of the sheet. When the proper ingredients to accomplish this object are introduced into the pulp, and are dried in the sheet with it, there is less liability of shrinking or swelling, or of absorbing moisture under the influences of heat and cold. Two important additions to the ingredients or substances used in the manufacture of these sheets, under my old process, are raw hides or untanned scraps, and bullock's blood or fibrine, one or both of which, for a floor-cloth or water-proof sheet, is almost indispensable.

In order to enable others to understand and make my improved carpet or floor-cloth, I give a full description of the process in making the same, as follows:

I take the ordinary tanned leather scraps from the tanners' or shoemakers' shops, and soak and wash the same by means of water, either pure or mixed with alkalies, acids, or other preparations, either heated or cold, in vats, pits, or an ordinary pulping engine, (and with or without beating or motive power, while washing, as the case may be,) to which is added from time to time, while pulping, such other vegetable or animal fibre as may be needed, usually preferring flax or hemp, before the glutinous matter has been removed from it, or with the addition of resinous or tarred substances. To these substances (which thus far are not dissimilar to those used in my previous patented process) I add, either before or after pulping, a proper quantity of untanned scraps of skins, or a quantity of bullock's blood or fibrine, or, in some cases, both of these substances, as the case may require, which are properly pulped or ground, and mixed with the first-mentioned substances in proper proportions. The mass is then run off on a suitable machine, or through rollers, in sheets of such dimensions as may be required for the purpose for which they are to be used, after which the sheets are dried and printed, painted, or stuffed in the ordinary way.

The sheets of "artificial leather," as it may be called, which are formed by this process, have the necessary strength and imperviousness to moisture, which it is my object to impart to them. The toughness and smoothness of the sheets, especially those in which the scrap-leather and vegetable fibre are combined with the raw hide and blood, fit them not only for use as floor-cloths, but adapt them to many other uses, such as for car-linings and the like.

Having now described my invention, what I claim, and desire to secure by Letters Patent, is—

1. Sheets made by combining pulped or ground tanned-leather scraps with vegetable fibre, and pulped untanned animal skins, to be used in the manufacture of floor-coverings or carpets. substantially as before described.

2. I claim sheets made by combining tanned-leather scraps and vegetable fibre with bullock's blood or fibrine, the whole being pulped or ground and run off into sheets, substantially as herein described.

3. I claim sheets made by combining pulped or ground tanned and untanned animal fibre or scraps of skins with vegetable fibre, further combined with bullock's blood or fibrine pulped and run off into sheets, substantially as before described and for the purposes specified.

4. I claim the stuffing, painting, staining, or printing, in the manner and for the purposes specified, sheets made by combining tanned scrap-leather and vegetable fibre with untanned scraps of hides, or with the further combination of bullock's blood or fibrine, manufactured substantially in the manner and for the purposes set forth.

5. I claim, as a new article of manufacture, a floor-covering or carpet, made by first forming a sheet of leather scraps and vegetable fibre combined with untanned scraps of hides, or with the further combination of bullock's blood or fibrine, the whole manufactured substantially as herein set forth.

In testimony whereof I have signed my name to this specification before two subscribing witnesses.

STEPHEN M. ALLEN.

Witnesses:
L. BURNETT,
GEO. T. ANGELL.